US010832682B2

(12) United States Patent
Fanty

(10) Patent No.: US 10,832,682 B2
(45) Date of Patent: Nov. 10, 2020

(54) METHODS AND APPARATUS FOR REDUCING LATENCY IN SPEECH RECOGNITION APPLICATIONS

(71) Applicant: Nuance Communications, Inc., Burlington, MA (US)

(72) Inventor: Mark Fanty, Norfolk, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 16/783,898

(22) Filed: Feb. 6, 2020

(65) Prior Publication Data
US 2020/0175990 A1 Jun. 4, 2020

Related U.S. Application Data

(63) Continuation of application No. 15/577,096, filed as application No. PCT/US2016/033736 on May 23, (Continued)

(51) Int. Cl.
G10L 17/00 (2013.01)
G10L 15/04 (2013.01)
G10L 15/01 (2013.01)
G10L 15/08 (2006.01)
G06F 3/16 (2006.01)
(Continued)

(52) U.S. Cl.
CPC ............ *G10L 17/005* (2013.01); *G06F 3/167* (2013.01); *G10L 15/01* (2013.01); *G10L 15/04* (2013.01); *G10L 15/05* (2013.01); *G10L 15/08* (2013.01); *G10L 15/183* (2013.01); *G10L 15/1815* (2013.01); *G10L 15/22* (2013.01); *G10L 15/30* (2013.01); *G10L 25/87* (2013.01);
(Continued)

(58) Field of Classification Search
USPC .................. 704/253, 251, 248, 246, 1–504
See application file for complete search history.

(56) References Cited

U.S. PATENT DOCUMENTS 6,535,851 B1 * 3/2003 Fanty ...................... G10L 15/04
704/249
7,720,683 B1 * 5/2010 Vermeulen ............. G10L 15/22
704/235
(Continued)

FOREIGN PATENT DOCUMENTS

WO    WO 02/060162 A2    8/2002

OTHER PUBLICATIONS

PCT/US2016/033736, Aug. 11, 2016, International Search Report and Written Opinion.
(Continued)

*Primary Examiner* — Marcus T Riley
(74) *Attorney, Agent, or Firm* — Wolf, Greenfield & Sacks, P.C.

(57) ABSTRACT

The method comprises receive first audio comprising speech from a user of a computing device, detecting an end of speech in the first audio, generating an ASR result based, at least in part, on a portion of the first audio prior to the detected end of speech, determining whether a valid action can be performed by a speech-enabled application installed on the computing device using the ASR result, and processing second audio when it is determined that a valid action cannot be performed by the speech-enabled application using the ASR result.

19 Claims, 7 Drawing Sheets

Related U.S. Application Data 2016, now Pat. No. 10,559,303, which is a continuation of application No. 14/721,252, filed on May 26, 2015, now Pat. No. 9,666,192.

(51) Int. Cl.
| | | |
|---|---|---|
| *G10L 15/05* | (2013.01) | |
| *G10L 15/18* | (2013.01) | |
| *G10L 15/183* | (2013.01) | |
| *G10L 15/22* | (2006.01) | |
| *G10L 25/87* | (2013.01) | |
| *G10L 15/30* | (2013.01) | |

(52) U.S. Cl.
CPC .. *G10L 2015/223* (2013.01); *G10L 2015/225* (2013.01); *G10L 2015/228* (2013.01)

(56) References Cited

U.S. PATENT DOCUMENTS

| | | | |
|---|---|---|---|
| 8,224,650 B2* | 7/2012 | Galanes | H04M 1/72561 |
| | | | 704/270.1 |
| 8,363,865 B1 | 1/2013 | Bottum | |
| 8,457,963 B2* | 6/2013 | Charriere | G10L 15/30 |
| | | | 455/412.1 |
| 8,762,150 B2* | 6/2014 | Edgington | G10L 15/04 |
| | | | 704/219 |
| 8,964,994 B2 | 2/2015 | Jaillet et al. | |
| 9,088,855 B2 | 7/2015 | Goodwin | |
| 9,241,218 B2 | 1/2016 | Walther | |
| 9,437,186 B1* | 9/2016 | Liu | G10L 15/05 |
| 9,484,021 B1* | 11/2016 | Mairesse | G10L 15/08 |
| 9,514,747 B1* | 12/2016 | Bisani | G10L 15/08 |
| 9,549,253 B2 | 1/2017 | Alexandridis et al. | |
| 9,558,740 B1* | 1/2017 | Mairesse | G10L 15/08 |
| 9,613,619 B2* | 4/2017 | Lev-Tov | G10L 15/26 |
| 9,666,192 B2* | 5/2017 | Fanty | G10L 15/01 |
| 9,922,640 B2* | 3/2018 | Rao | G10L 15/04 |
| 10,121,471 B2* | 11/2018 | Hoffmeister | G10L 15/18 |
| 10,134,388 B1* | 11/2018 | Lilly | G06F 40/268 |
| 10,559,303 B2* | 2/2020 | Fanty | G10L 15/04 |
| 2004/0121812 A1* | 6/2004 | Doran | H04M 1/271 |
| | | | 455/563 |
| 2006/0080096 A1* | 4/2006 | Thomas | G10L 25/87 |
| | | | 704/234 |
| 2008/0208600 A1 | 8/2008 | Pang et al. | |
| 2008/0219466 A1 | 9/2008 | Pishehvar et al. | |
| 2009/0080666 A1 | 3/2009 | Uhle et al. | |
| 2009/0252341 A1 | 10/2009 | Goodwin | |
| 2009/0299742 A1 | 12/2009 | Toman et al. | |
| 2010/0248786 A1* | 9/2010 | Charriere | G10L 15/30 |
| | | | 455/563 |
| 2012/0072211 A1* | 3/2012 | Edgington | G10L 15/04 |
| | | | 704/231 |
| 2013/0272526 A1 | 10/2013 | Walther | |
| 2014/0072121 A1 | 3/2014 | Harma et al. | |
| 2014/0222430 A1* | 8/2014 | Rao | G10L 15/04 |
| | | | 704/254 |
| 2015/0120289 A1* | 4/2015 | Lev-Tov | G10L 15/02 |
| | | | 704/231 |
| 2015/0310870 A1 | 10/2015 | Vouin et al. | |
| 2016/0351196 A1* | 12/2016 | Fanty | G10L 15/08 |
| 2016/0379632 A1* | 12/2016 | Hoffmeister | G10L 15/26 |
| | | | 704/253 |
| 2017/0206907 A1 | 7/2017 | Wang et al. | |
| 2018/0174582 A1* | 6/2018 | Fanty | G10L 15/183 |
| 2020/0175990 A1* | 6/2020 | Fanty | G10L 17/005 |

OTHER PUBLICATIONS

PCT/US2016/033736, Dec. 7, 2017, International Preliminary Report on Patentability.
International Search Report and Written Opinion for International Application No. PCT/US2016/033736 dated Aug. 11, 2016.
International Preliminary Report on Patentability for International Application No. PCT/US2016/033736 dated Dec. 7, 2017.
Lu et al., Decision of Response Timing for Incremental Speech Recognition with Reinforcement Learning. 2011 IEEE Workshop on Automatic Speech Recognition and Understanding. 2011;467-72.

\* cited by examiner

METHODS AND APPARATUS FOR REDUCING LATENCY IN SPEECH RECOGNITION APPLICATIONS

CROSS-REFERENCE TO RELATED APPLICATIONS

This Application is a Continuation of U.S. application Ser. No. 15/577,096, filed Nov. 27, 2017, entitled "METHODS AND APPARATUS FOR REDUCING LATENCY IN SPEECH RECOGNITION APPLICATIONS," which is a national-stage filing under 35 U.S.C. 371 of International Patent Application Serial No. PCT/US2016/033736, filed May 23, 2016, entitled "METHODS AND APPARATUS FOR REDUCING LATENCY IN SPEECH RECOGNITION APPLICATIONS," which is a Continuation of U.S. application Ser. No. 14/721,252, filed May 26, 2015, entitled "METHODS AND APPARATUS FOR REDUCING LATENCY IN SPEECH RECOGNITION APPLICATIONS." The entire contents of each of these earlier applications is incorporated by reference herein.

BACKGROUND

Some electronic devices, such as smartphones and tablet computers, include or are associated with speech recognition capabilities that enable users to access functionality of the device via speech input. Speech input is processed by an automatic speech recognition (ASR) system, which converts the input audio to recognized text. Electronic devices may also include or be associated with a natural language understanding (NLU) engine that interprets user input and takes an action based upon determined semantic content of the user's input (e.g., by facilitating actions with one or more applications accessible via the electronic device). Virtual agents or virtual assistants are one such class of applications that benefit from NLU processing to assist users in performing functions such as searching for content on a network (e.g., the Internet) and interfacing with other applications. Users can interact with a virtual agent by typing, touch, speech, or some other interface. To determine a meaning of a user input, the NLU engine interprets the user input, and a virtual agent may attempt to infer an action the user wants to perform based on the NLU result.

SUMMARY

Some embodiments are directed to a computing device including a speech-enabled application installed thereon. The computing device comprises an input interface configured to receive first audio comprising speech from a user of the computing device, an automatic speech recognition (ASR) engine configured to detect based, at least in part, on a threshold time for endpointing, an end of speech in the first audio, and generate a first ASR result based, at least in part, on a portion of the first audio prior to the detected end of speech. The computing device further comprises at least one processor programmed to determine whether a valid action can be performed by the speech-enabled application using the first ASR result, and instruct the ASR engine to process second audio when it is determined that a valid action cannot be performed by the speech-enabled application using the first ASR result.

Other embodiments are directed to a method. The method comprises receiving, by an input interface of a computing device, first audio comprising speech from a user of the computing device, detecting, by an automatic speech recognition (ASR) engine of the computing device, an end of speech in the first audio, generating, by the ASR engine, an ASR result based, at least in part, on a portion of the first audio prior to the detected end of speech, determining whether a valid action can be performed by a speech-enabled application installed on the computing device using the ASR result, and instructing the ASR engine to process second audio when it is determined that a valid action cannot be performed by the speech-enabled application using the ASR result.

Other embodiments are directed to a computer-readable storage medium encoded with a plurality of instructions that, when executed by a computing device, performs a method. The method comprises receiving first audio comprising speech from a user of the computing device, detecting an end of speech in the first audio, generating an ASR result based, at least in part, on a portion of the first audio prior to the detected end of speech, determining whether a valid action can be performed by a speech-enabled application installed on the computing device using the ASR result, and processing second audio when it is determined that a valid action cannot be performed by the speech-enabled application using the ASR result.

It should be appreciated that all combinations of the foregoing concepts and additional concepts discussed in greater detail below (provided that such concepts are not mutually inconsistent) are contemplated as being part of the inventive subject matter disclosed herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
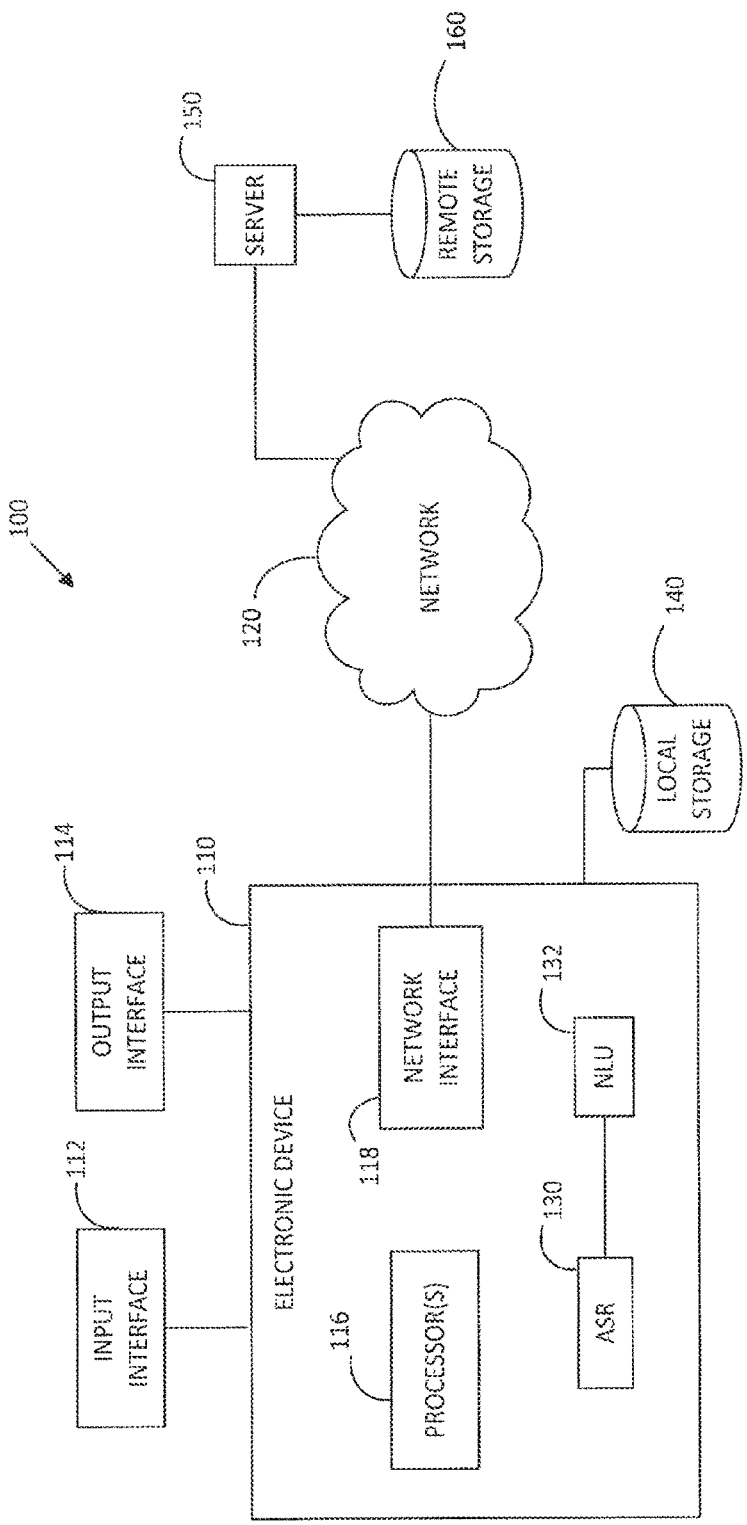
FIG. 1 is a schematic illustration of a client-server system for use with speech-enabled applications in accordance with some embodiments.

Users of electronic devices that include or are associated with automatic speech recognition (ASR) and/or natural language understanding (NLU) processing often report that the latency of receiving results after providing speech input is a significant factor influencing a positive user experience. To reduce latency, most or all ASR and/or NLU processing can be performed locally on the device. However, this approach may be undesirable for some devices with limited memory and/or processing resources. As discussed in further detail below, distributed systems where at least a portion of the ASR and/or NLU processing is provided by one or more servers connected to the device (e.g., via one or more networks) in a client/server architecture are frequently used to reduce the resource burden on client devices. Sending and receiving information over network(s) increases the latency associated with ASR and/or NLU processing, and some embodiments discussed further below are directed to techniques for reducing latencies associated with distributed ASR and/or NLU processing to improve the user experience with applications on the client device that use ASR and/or NLU processing.

Systems that process audio including speech input for ASR typically determine when the user has finished speaking based on an analysis of the speech input. The process for determining when a user has finished speaking is often referred to as "endpoint detection." Endpoint detection may be accomplished by determining when the user's speech has ended for an amount of time that exceeds a threshold or timeout value (e.g., three seconds). The audio including speech is processed by an ASR engine to generate a textual ASR result. The ASR result may then be processed by an NLU engine, as discussed above, to infer an intended action that the user would like to perform.

Premature endpoint detection (i.e., determining that the user was done speaking before the user has finished the input the user desired to provide) typically results in the processing by an NLU engine of an ASR result with insufficient information for the NLU engine to properly infer an intended action for the user's desired input. The inventors have recognized and appreciated that premature endpoint detection often arises in cases where a user pauses in the middle of an utterance while the user thinks about what to say next. For example, a user asking a speech-enabled application for directions may say, "I would like directions to," followed by a pause while the user thinks about the destination location. An ASR result corresponding to the utterance "I would like directions to" would typically be interpreted by an NLU engine associated with the speech-enabled application as either being an error and/or as being incomplete. To enable the NLU engine to determine an NLU result that could be used by a speech-enabled application to perform a valid action, the user may be required to start over or provide additional information in a new utterance, either of which is time consuming and detracts from the user experience.

A technique for reducing the frequency of premature endpoint detections is to increase the timeout value used for endpoint detection. However, doing so causes a higher latency for all utterances, resulting in an unfavorable user experience. Some embodiments described herein are directed to techniques for selectively and dynamically controlling the endpoint detection process during processing of speech input in an effort to reduce the number of ASR results with insufficient information sent to and processed by the NLU engine.

Other embodiments are directed to reducing latency associated with remote NLU processing by storing at least some NLU results (e.g., NLU results for recent, frequent, and/or any other desired type of utterances) in a local storage device of a client device. By locally storing or "caching" at least some NLU results on a client device, the cached NLU results may be obtained with reduced latency compared to server-based NLU processing, and may be obtained even when a network connection to the server is not available.

Other embodiments are directed to training users on options for interacting with a speech-enabled application (e.g., a voice-enabled virtual assistant application) installed on a client device by displaying dynamically-generated hints on a user interface of the client device. Because the dynamically-generated hints are generated based, at least in part, what the user has already said, the user learns how to interact with the speech-enabled application in future utterances and the hint also provides the user with information regarding how to complete an input in progress.

The techniques described herein may be implemented in any application or system that uses NLU-based processing. In some embodiments, described below, an NLU system using the techniques described herein may be used to facilitate interactions between a user and a virtual assistant (e.g., implemented as an application executing on an electronic device such as a smartphone). However, this is but one illustrative use for the techniques described herein, as they may be used with any NLU system in any environment.

FIG. 1 shows an illustrative computing environment 100 that may be used in accordance with some embodiments of the invention. Computing environment 100 includes electronic device 110. In some embodiments, electronic device 110 may be a client device in a client-server architecture, as discussed in more detail below. Electronic device 110 includes input interface 112 configured to receive user input. The input interface may take any form as the aspects of the invention are not limited in this respect. In some embodiments, input interface 112 may include multiple input interfaces each configured to receive one or more types of user input. For example, input interface 112 may include a keyboard (e.g., a QWERTY keyboard), a keypad, a touch-sensitive screen, a mouse, or any other suitable user input device. As another example, input interface may include a microphone that, when activated, receives speech input, and the system may perform automatic speech recognition (ASR) either locally on the electronic device, remotely (e.g., on a server), or distributed between both. The received speech input may be stored in a datastore (e.g., local storage 140) associated with electronic device 110 to facilitate the ASR processing.

Electronic device 110 also includes output interface 114 configured to output information from electronic device 110. The output interface may take any form, as aspects of the invention are not limited in this respect. In some embodiments, output interface 114 may include multiple output interfaces each configured to provide one or more types of output. For example, output interface 114 may include one or more displays, one or more speakers, or any other suitable output device. Applications executing on electronic device 110 may be programmed to display a user interface to facilitate the performance of one or more actions associated with the application. In one example described herein, the application displays a user interface that provides dynamically-generated hints to a user to help the user complete an input in progress, as described in more detail below.

Electronic device 110 also includes one or more processors 116 programmed to execute a plurality of instructions to perform one or more functions on electronic device 110. Exemplary functions include, but are not limited to, facilitating the storage of user input, launching and executing one or more applications on electronic device 110, and providing output information via output interface 114. Exemplary functions also include performing speech recognition (e.g., using ASR engine 130) and performing natural language understanding (e.g., using NLU system 132), as discussed in more detail below.

Electronic device 110 also includes network interface 122 configured to enable electronic device 110 to communicate with one or more computers via network 120. Some embodiments may be implemented using a client/server system where at least a portion of an ASR and/or an NLU process is performed remotely from electronic device 110. In such embodiments, network interface 122 may be configured to provide information to one or more server devices 150 to perform ASR, an NLU process, both ASR and an NLU process, or some other suitable function. Server 150 may be associated with one or more non-transitory datastores (e.g., remote storage 160) that facilitate processing by the server.

Network 120 may be implemented in any suitable way using any suitable communication channel(s) enabling communication between the electronic device and the one or more computers. For example, network 120 may include, but is not limited to, a local area network, a wide area network, an Intranet, the Internet, wired and/or wireless networks, or any suitable combination of local and wide area networks. Additionally, network interface 122 may be configured to support any of the one or more types of networks that enable communication with the one or more computers.

In some embodiments, electronic device 110 is configured to process speech received via input interface 112, and to produce at least one speech recognition result using ASR engine 130. ASR engine 130 is configured to process audio including speech using automatic speech recognition to determine a textual representation corresponding to at least a portion of the speech. ASR engine 130 may implement any type of automatic speech recognition to process speech, as the techniques described herein are not limited to the particular automatic speech recognition process(es) used. As one non-limiting example, ASR engine 130 may employ one or more acoustic models and/or language models to map speech data to a textual representation. These models may be speaker independent or one or both of the models may be associated with a particular speaker or class of speakers. Additionally, the language model(s) may include domain-independent models used by ASR engine 130 in determining a recognition result and/or models that are tailored to a specific domain. The language model(s) may optionally be used in connection with a natural language understanding (NLU) system (e.g., NLU system 132), as discussed in more detail below. ASR engine 130 may output any suitable number of recognition results, as aspects of the invention are not limited in this respect. In some embodiments, ASR engine 130 may be configured to output N-best results determined based on an analysis of the input speech using acoustic and/or language models, as described above.

Electronic device 110 also includes NLU system 132 configured to process a textual representation to gain some semantic understanding of the input, and output one or more NLU hypotheses based, at least in part, on the textual representation. In some embodiments, the textual representation processed by NLU system 132 may comprise one or more ASR results (e.g., the N-best results) output from an ASR engine (e.g., ASR engine 130), and the NLU system may be configured to generate one or more NLU hypotheses for each of the ASR results. It should be appreciated that in addition to an ASR result, NLU system 132 may also process other suitable textual representations. For example, a textual representation entered via a keyboard, a touch screen, or received using some other input interface may additionally be processed by an NLU system in accordance with the techniques described herein. Additionally, text-based results returned from a search engine or provided to electronic device 110 in some other way may also be processed by an NLU system in accordance with one or more of the techniques described herein. The NLU system and the form of its outputs may take any of numerous forms, as the techniques described herein are not limited to use with NLU systems that operate in any particular manner.

The electronic device 110 shown in FIG. 1 includes both ASR and NLU processes being performed locally on the electronic device 110. In some embodiments, one or both of these processes may be performed in whole or in part by one or more computers (e.g., server 150) remotely located from electronic device 110. For example, in some embodiments that include an ASR component, speech recognition may be performed locally using an embedded ASR engine associated with electronic device 110, a remote ASR in network communication with electronic device 110 via one or more networks, or speech recognition may be performed using a distributed ASR system including both embedded and remote components. In some embodiments, NLU system 132 may be located remotely from electronic device 110 and may be implemented using one or more of the same or different remote computers configured to provide some or all of the remote ASR processing. Additionally, it should be appreciated that computing resources used in accordance with any one or more of ASR engine 130 and NLU system 132 may also be located remotely from electronic device 110 to facilitate the ASR and/or NLU processes described herein, as aspects of the invention related to these processes are not limited in any way based on the particular implementation or arrangement of these components within a computing environment 100.

Figure 2:
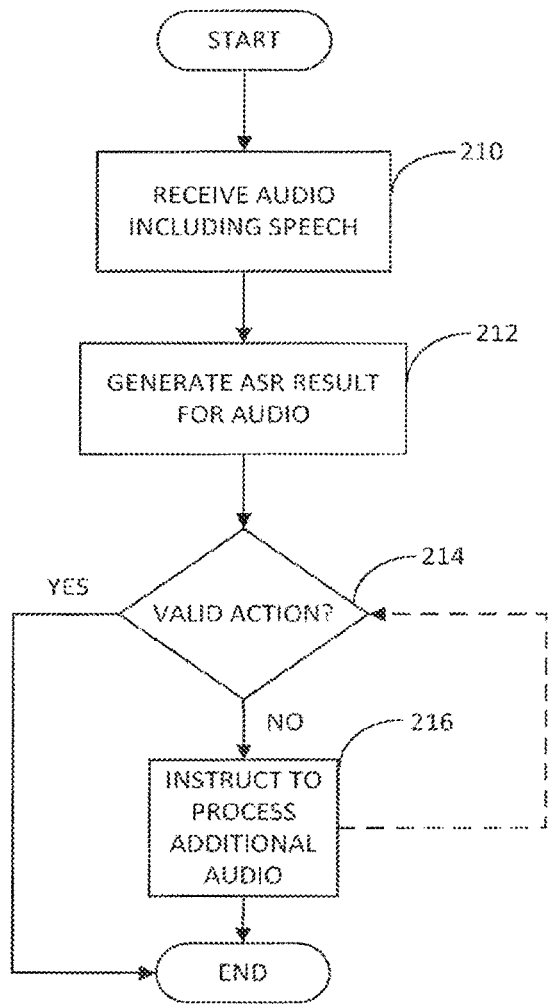
FIG. 2 illustrates a process for determining whether a valid action for a speech-enabled application may be performed based on an ASR result in accordance with some embodiments.

FIG. 2 illustrates a process for assessing whether input speech includes sufficient information to allow a speech-enabled application to perform a valid action, in accordance with some embodiments. In act 210, audio including speech is received. The audio may be received in any suitable way. For example, an electronic device may include a speech input interface configured to receive audio including speech, as discussed above. The process then proceeds to act 212, where at least a portion of the received audio is processed by an ASR engine to generate an ASR result. As discussed above, any suitable ASR process may be used to recognize at least a portion of the received audio, as aspects of the invention are not limited in this respect. For example, in some embodiments, the ASR engine processes the received audio to detect an end of speech in the audio, and the portion of the audio prior to the detected end of speech is processed to generate the ASR result.

The process then proceeds to act 214, where it is determined whether the speech in the received audio includes sufficient information to allow a speech-enabled application to perform a valid action. Determining whether the speech includes sufficient information to allow a speech-enabled application to perform a valid action may be determined in any suitable way. In some embodiments, the ASR result output from the ASR engine may be processed by an NLU system to generate an NLU result, and the determination of whether the speech includes sufficient information to allow a speech-enabled application to perform a valid action may be based, at least in part, on the NLU result. As discussed above, some NLU systems may process input text and return an error and/or an indication that the input text is insufficient to enable an application to perform a valid action. The error and/or indication that the text input to the NLU includes insufficient information to allow a speech-enabled application to perform a valid action may be used, at least in part, to determine that the endpointing by the ASR engine was performed prematurely (i.e., the user had not finished speaking a desired input prior to the endpointing process being completed).

In some embodiments, determining whether the received speech includes sufficient information to allow a speech-enabled application to perform a valid action may be determined based, at least in part, on the content of the ASR result output from the ASR engine. For example, as discussed in more detail below, some embodiments compare the ASR result to one or more prefixes stored in local storage on the electronic device, and the determination of whether the received speech includes sufficient information to allow a speech-enabled application to perform a valid action is made, based, at least in part, on whether the ASR result matches one or more of the locally-stored prefixes.

If it is determined in act 214 that the speech in the received audio includes sufficient information to allow a speech-enabled application to perform a valid action, the process ends and the utterance is processed as it otherwise would be in the absence of the techniques described herein. Conversely, if it is determined that the speech in the received audio does not include sufficient information to allow a speech-enabled application to perform a valid action, the process proceeds to act 216, where the ASR engine is instructed to process additional audio. The additional audio processed by the ASR engine may be used to supplement the received audio with insufficient information to allow a speech-enabled application to perform a valid action, as discussed in more detail below.

As discussed above, a factor that may contribute to increased processing latencies during use of a speech-driven application that incorporates NLU techniques is premature endpoint detection. Endpoint detection is typically accomplished by assuming that a user has finished speaking by detecting the end of speech (e.g., by detecting silence) in the received audio, and determining that a particular threshold amount of time (e.g., three seconds) has passed since the end of speech was detected. The timeout value used for determining when to endpoint may be a fixed value set by an application programmer, or may be variable based on the use of one or more speech-enabled applications by user(s) of the electronic device. As discussed above, selecting a long timeout value results in processing latency delays for all utterances, and selecting a short timeout value may result in premature endpoint detection for some utterances (e.g., utterances in which the speaker pauses while thinking about what to say next).

Figure 3:
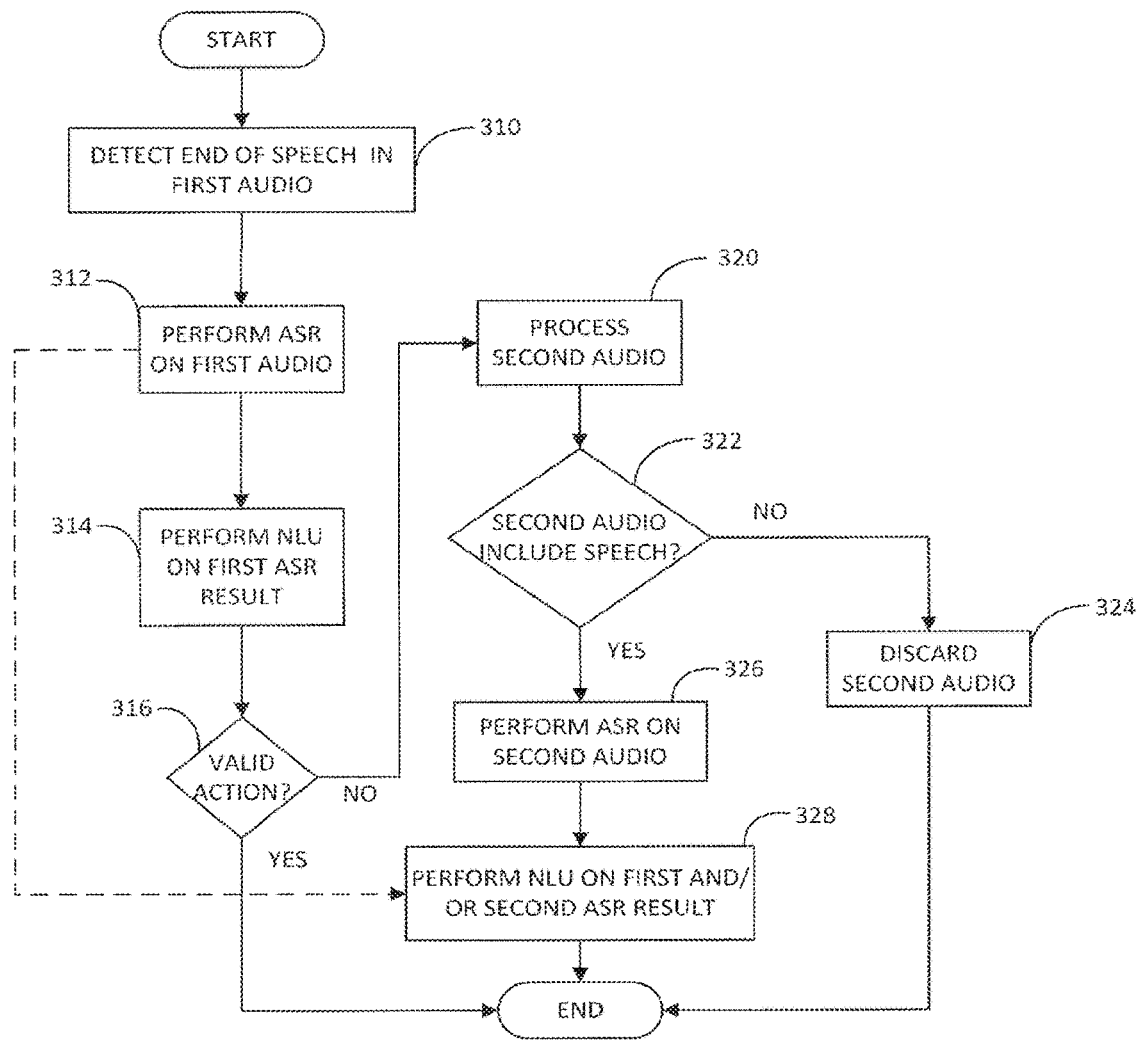
FIG. 3 illustrates a process for reducing premature endpointing in accordance with some embodiments.

Some embodiments are directed to techniques for recovering from and/or preventing premature endpoint detection by processing audio after the timeout value used for the endpoint detection process has expired. FIG. 3 illustrates a process for recovering from premature endpoint detection in accordance with some embodiments. In act 310, the end of speech in received audio is determined. The end of speech may be determined in any suitable way, as aspects of the invention are not limited in this respect. For example, the end of speech may be determined based, at least in part, on a detected energy level in the audio signal, or the end of speech may be determined by analyzing one or more other characteristics of the audio signal.

As discussed above, some conventional endpoint detection techniques determine that a user has stopped speaking after a threshold amount of time has passed following detection of the end of speech. A determination of whether the threshold amount of time has passed may be made in any suitable way. For example, at a time corresponding to when the end of speech is first detected, a timer may be started, and if a particular amount of time elapses after the timer is started it may be determined that the threshold amount of time has passed, and that the speaker had finished speaking.

In response to detecting the end of speech in the first audio, the process proceeds to act 312, where ASR is performed on the first audio (e.g., the audio received before the detected endpoint) to generate a first ASR result for the first audio. Although performing ASR on the first audio is shown as being performed only after an end of speech is detected in the first audio, in some embodiments, an ASR process may be initiated any time after at least a portion of the first audio is received, as aspects of the invention are not limited in this respect. For example, ASR may be performed on one or more time segments of the first audio prior to detecting the end of speech in the first audio to determine whether the first audio includes a locally-stored prefix, as discussed in more detail below.

After an ASR result for the first audio has been generated in act 312, the process proceeds to act 314, where NLU is performed on the ASR result to generate a first NLU result. NLU may be performed on all or a portion of the ASR result generated for the first audio and the NLU process may be initiated at any time after at least a portion of the first audio has been recognized using an ASR process. Optionally, the first ASR result may be stored for possible combination with a second ASR result generated based, at least in part, on second received audio, as described in more detail below.

After the first NLU result is generated in act 314, the NLU result may be analyzed in act 316 to determine whether the first NLU result includes sufficient information to allow a speech-enabled application to perform a valid action or whether additional audio input is necessary to allow a speech-enabled application to perform a valid action. Whether the first NLU result includes sufficient information to allow a speech-enabled application to perform a valid action may be determined in any suitable way. For example, if the speech-enabled application is a navigation application, the NLU result may be considered to include sufficient information when the result includes both an action to be performed (e.g., "provide directions to") and information used in performing the action (e.g., a destination).

If it is determined that the first NLU result includes sufficient information to allow a speech-enabled application to perform a valid action, the NLU result is provided to the speech-enabled application, and the process ends. Otherwise, the process proceeds to act 320, where second audio, including audio recorded after the end of speech is detected in the first audio, is processed. In some embodiments, analyzing the second audio comprises processing at least some of the second audio as part of a single utterance including at least some of the first audio.

Although shown in FIG. 3 as being initiated upon determining that an NLU result includes insufficient information to allow a speech-enabled application to perform a valid action, in some embodiments, processing the second audio may be initiated prior to determining that the NLU result for the first audio includes such insufficient information. For example, processing of at least some of the second audio may be started immediately following (or shortly thereafter) processing of the first audio so that the time between processing the first audio and processing the second audio is short. In some embodiments, processing of the second audio may additionally or alternatively be initiated by any suitable trigger including, but not limited to, detection of evidence that the user has resumed speaking. In some embodiments, a combination of events may trigger the processing of the second audio. Regardless of the event(s) that triggers the processing of the second audio, information in the second audio may supplement the information in the first audio to reduce premature endpointing for speech-enabled applications, as discussed in more detail below.

The second audio may be of any suitable duration. In some embodiments, the second audio may comprise audio for a fixed amount of time (e.g., three seconds), whereas in other embodiments, the second audio may comprise audio for a variable amount of time (e.g., based on detecting an end of speech in the second audio). The process then proceeds to act 322, where it is determined whether the second audio includes speech. The determination of whether the second audio includes speech may be made in any suitable way, for example, using well-known techniques for detecting speech in an audio recording.

If it is determined in act 322 that the second audio does not include speech, the process proceeds to act 324, where the second audio is discarded and the process ends. If it is determined that the second audio includes speech, the process proceeds to act 326, where ASR is performed on at least a portion of the second audio to generate a second ASR result. In some embodiments, the second ASR result is generated based, at least in part, on an analysis of at least a portion of the first audio and at least a portion of the second audio. In other embodiments, the second ASR result is generated based only on an analysis of at least a portion of the second audio. ASR may be performed on at least a portion of the second audio at any suitable time, and embodiments are not limited in this respect. For example, ASR may be performed any time following detection of speech in the second audio so that the ASR processing may begin before the entire second audio is received.

The process then proceeds to act 328, where NLU is performed based, at least in part, on the first ASR result and/or the second ASR result. In some embodiments, NLU may be performed based only on the second ASR result to generate a second NLU result, and the second NLU result may be combined with the first NLU result generated in act 318 to produce a combined NLU result for interpretation by a speech-enabled application. In other embodiments, an NLU system may receive both the first ASR result and the second ASR result and the ASR results may be combined prior to performing NLU on the combined ASR result. In yet other embodiments, the second ASR result may be generated based, at least in part, on a portion of the first audio and at least a portion of the second audio, as described above. A benefit of these latter two approaches is that the ASR result processed by the NLU system appears to the NLU system as if it was recognized from a single utterance, and thus, may be more likely to generate an NLU result that can be interpreted by the speech-enabled application to perform a valid action.

As discussed above in connection with the process of FIG. 2, some embodiments are configured to process second audio in response to determining that received first audio does not include sufficient information to allow a speech-enabled application to perform a valid action. Determining that the received first audio includes insufficient information for a speech-enabled application to perform a valid action may be made in any suitable way including, but not limited to, receiving an NLU result corresponding to the received first audio from an NLU system that includes such insufficient information.

The inventors have recognized and appreciated that storing or "caching" one or more prefixes in local storage accessible to a client device may facilitate the identification of audio that may include insufficient information to allow a speech-enabled application to perform a valid action if the default timeout value (e.g., three seconds) is used for endpointing. For example, commonly and/or frequently used prefixes known to be associated with user pauses may be locally stored by a client device, and identification of a locally-stored prefix in received audio may mitigate premature endpointing. Accordingly, in some embodiments, an ASR result corresponding to received audio may be compared to one or more prefixes stored locally on a client device, and a threshold time used for endpointing may be dynamically adjusted based, at least in part, on a threshold time associated with a matching locally-stored prefix, as discussed in more detail below. By dynamically adjusting the threshold time used for endpointing based on particular detected prefixes, the number of premature endpointing occurrences may be reduced. For example, prefixes that are often associated with user pauses following the prefix may be associated with longer threshold times, thereby allowing longer audio recording times for those utterances prior to endpointing. Additionally, because the threshold times are not lengthened for all utterances, the latencies associated with speech recognition and/or natural language processing are not substantially increased, resulting in a more desirable user experience than if the threshold times were increased for all utterances.

Figure 4:
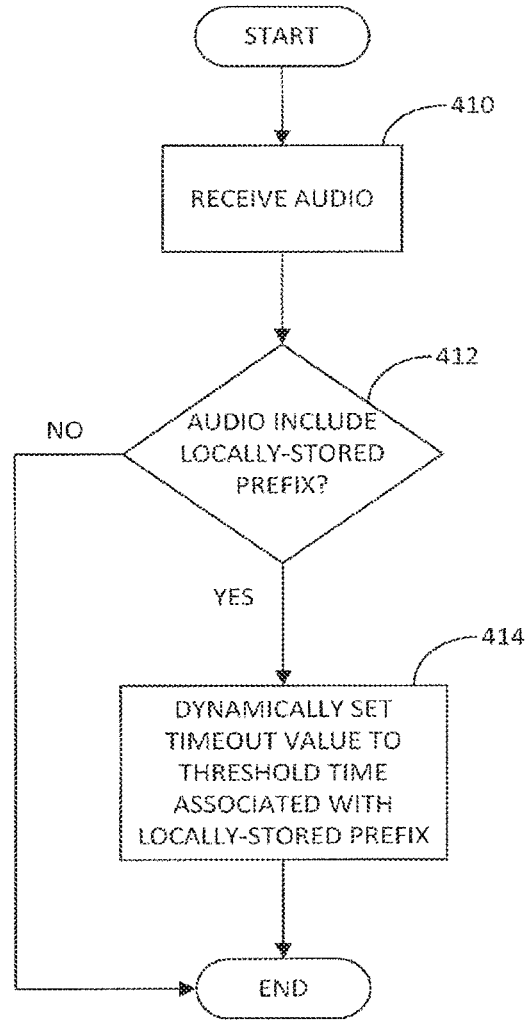
FIG. 4 illustrates a process for dynamically setting a timeout value for an ASR process in accordance with some embodiments.

FIG. 4 illustrates a process for dynamically adjusting a threshold time used for endpointing in accordance with some embodiments. In act 410, audio is received (e.g., from a microphone). The process then proceeds to act 412, where the received audio is analyzed (e.g., by ASR processing and/or NLU processing) to determine whether the audio includes a locally-stored prefix. As discussed above, one or more prefixes may be locally stored on a client device configured to receive speech input. The locally-stored prefix(es) may include any suitable prefix often followed by a pause that may cause an endpointing process to timeout. For example, certain prefixes such as "directions to" are often followed by pauses while the speaker thinks about what to say next. In some embodiments, the prefix "directions to" and/or other suitable prefixes may be stored locally on a client device.

The received audio may be processed and compared to the locally-stored prefix(es) in any suitable way, and embodiments are not limited in the respect. For example, at least a portion of received audio may be processed by an ASR engine, and an ASR result output from the ASR engine may be compared to locally-stored prefixes to determine whether the ASR result matches any of the locally-stored prefixes. The ASR processing and comparison should occur quickly enough to alter a timeout value for endpointing on the fly if a match to a locally-stored prefix is identified. For example, if the default timeout for endpointing is three seconds, the cached prefix lookup should preferably take less than three seconds to enable the timeout value used for endpointing to be lengthened, if appropriate, based on the identification of a cached prefix in the received audio.

In some embodiments, multiple short time segments (e.g., 20 ms) of the first audio may be processed by the ASR engine to facilitate the speed by which an ASR result is determined based, at least in part, on at least a portion of the received audio. As more of the audio is received, the ASR processing may continually update the ASR results output from the ASR engine. During this process, a current ASR result output from the ASR engine may be compared to the cached prefixes in an attempt to identify a match. Performing the ASR and comparison processes, at least in part, in parallel may further speed up the process of identifying a locally-stored prefix in the received audio.

If it is determined in act 412 that the received audio does not include a locally-stored prefix the process ends and the default timeout value for endpointing is used. If it is determined in act 412 that the received audio includes a locally-stored prefix, the process proceeds to act 414, where the timeout value for endpointing is dynamically set based, at least in part, on a threshold time associated with the identified locally-stored prefix.

Locally-stored prefixes and their associated threshold times may be stored in any suitable way using one or more data structures, and the one or more data structures may be updated periodically and/or in response to a request to do so. The stored prefixes and their corresponding threshold times may be determined in any suitable way and may be user independent and/or user specific. For example, the locally-stored prefixes may be determined based, at least in part, on ASR data for a plurality of users to identify the most common prefixes that cause ASR to timeout. In some embodiments, an initial set of prefixes based on user-independent data analysis may be updated based on individual user behavior. In other embodiments, a user independent set of prefixes may not be used, and the local cache of prefixes may be determined by a manual selection or programming of the client device on which ASR is performed and/or the cache of prefixes may be established only after a user has used the client device for a particular amount of time to enable the cache to be populated with appropriate prefixes based on the user's individual behavior. In some embodiments, the locally-stored cache may include one or more first prefixes determined based on user-independent data analysis and one or more second prefixes determined based on user-specific data analysis. Not all embodiments require the use of both user-independent and user-specific prefixes, as some embodiments may include user-specific prefixes only, some embodiments may include user-independent prefixes only, and other embodiments may include both user-specific and user-independent prefixes.

As discussed above, each of the locally-stored prefixes may be associated with a threshold time suitable for use as an endpointing timeout value for the prefix. The threshold times for each prefix may be determined in any suitable way and one or more of the threshold times may be user independent and/or user specific, as discussed above. In some embodiments, a threshold time for a locally-stored prefix is determined based, at least in part, on an analysis of pause length for a plurality of speakers who uttered the prefix. For example, the threshold time for the prefix "directions to" may be determined based, at least in part, using the average pause length for 1000 utterances for different speakers speaking that prefix. The threshold time associated with a locally-stored prefix may be updated at any suitable interval as more data for a particular prefix is received from a plurality of speakers and/or from an individual speaker. By determining threshold times for prefixes from individual speakers, a suitable threshold time for each prefix may be established for the speaker, thereby providing an ASR system with reduced premature endpointing tuned to a particular speaker's speaking style.

Performing both ASR and NLU on a client device provides for low latencies and works even when a network connection to a server is not available. However, servers often include more processing and/or storage resources than client devices, which may result in better accuracy compared to client-based ASR processing and/or NLU processing. Hybrid ASR or NLU systems attempt to tradeoff accuracy for processing latency by distributing ASR and/or NLU processing between clients and servers in a client-server environment.

The inventors have recognized and appreciated that the increased latencies and intermittent server unavailability for server-based NLU systems are a contributing factor to user frustration with such systems. To improve user experiences with speech-based systems that perform at least some NLU processing on a server, some embodiments store locally on the client device, representations of recent and/or frequent utterances (e.g., ASR results for the utterances) and an NLU result associated with those representations. By locally caching NLU results for recent and/or frequent utterances, the corresponding NLU results may be quickly available on the client device even if the client device itself does not perform any NLU processing.

Figure 5:
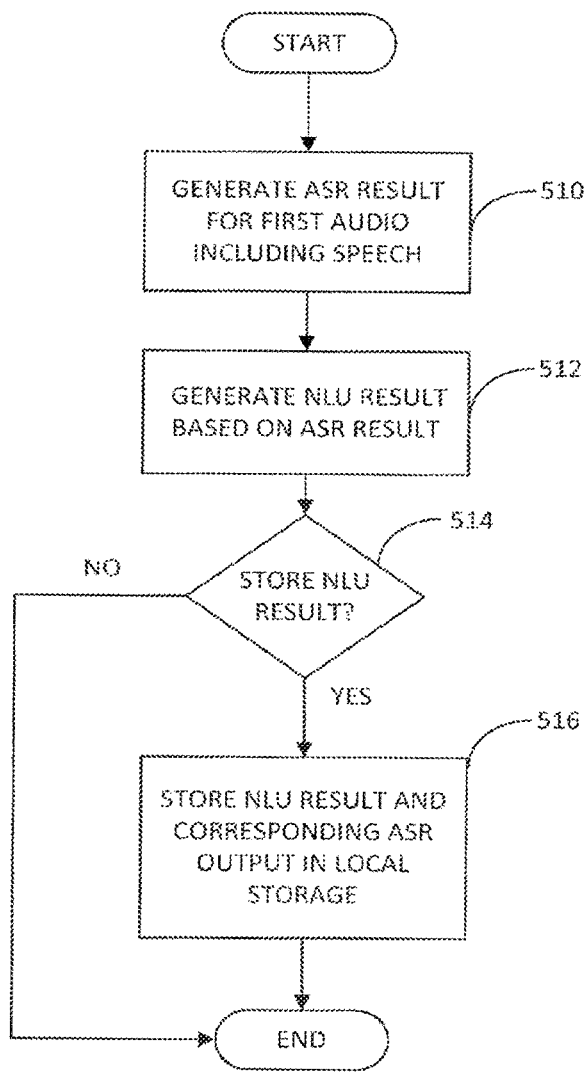
FIG. 5 illustrates a process for storing NLU results on local storage of a client device in accordance with some embodiments.

FIG. 5 illustrates a process for storing on a client device, in a client-server architecture, NLU results for one or more recent and/or frequent utterances in accordance with some embodiments. In act 510, an ASR result for first audio including speech is generated by an ASR process. The ASR process may be completely or partially performed using an ASR engine on the client device and/or the server. The process then proceeds to act 512, where an NLU process is performed by the server to generate an NLU result based, at least in part, on the ASR result. The NLU result is then returned to the client device.

After generating the NLU result, the process proceeds to act 514, where it is determined whether to store the generated NLU result in local storage associated with the client device. The determination of whether to locally cache the generated NLU result may be based on one or more factors including, but not limited to, how frequently the NLU result has been received from the server, the available storage resources of the client device, and how current the usage of the utterance is. For example, in some embodiments, provided that the client device has sufficient storage resources, representations of all utterances and their corresponding NLU results for the previous 24 hour period may be cached locally on the client device. In other embodiments, representations of frequently recognized utterances within a particular period of time (e.g., five times in the past 24 hours) may be cached locally with their corresponding NLU results, whereas representations of less frequently recognized utterances within the same period of time (e.g., one time in the past 24 hours) and their NLU results may not be cached locally. Any suitable criterion or criteria may be used to establish the cutoff used in determining when to cache representations of utterances and their NLU results locally on a client device, and the foregoing non-limiting examples are provided merely for illustration.

If it is determined in act 514 not to locally cache the NLU result, the process ends. If it is determined in act 514 to locally cache the NLU result, the process proceeds to act 516, where a representation of the utterance (e.g., the ASR output associated with the utterance) and a corresponding NLU result return from the server is stored in local storage. For example, the representation of the utterance and its corresponding NLU result may be added to one or more data structures stored on local storage. In some embodiments, a small, local grammar that enables fast and highly-constrained ASR processing by the client device may be additionally be created for use in recognizing the frequently occurring utterance. It should be appreciated however, that not all embodiments require the creation of a grammar, and aspects of the invention are not limited in this respect.

Figure 6:
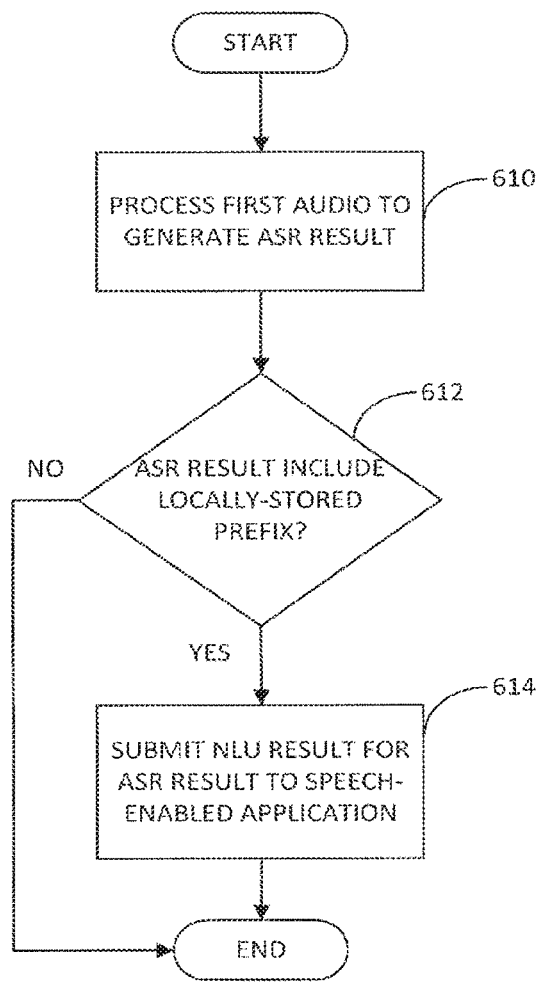
FIG. 6 illustrates a process for using NLU results stored on local storage of a client device in accordance with some embodiments.

FIG. 6 illustrates a process for using a locally-cached NLU result in accordance with some embodiments. In act 610, a client device performs an ASR process on audio including speech to produce an ASR result. The process then proceeds to act 612, where it is determined whether the ASR result includes any of the one or more representations of utterances locally stored by the client device.

If it is determined in act 612 that the ASR result does not include any of the cached utterance representations, the process ends. Otherwise, if it is determined in act 612 that the ASR result includes a locally-stored representation of an utterance, the process proceeds to act 614, where the cached NLU result associated with the identified locally-stored utterance representation is submitted to a speech-enabled application to allow the speech-enabled application to perform one or more valid actions based, at least in part, on a locally-cached NLU result. For example, if the identified locally-stored utterance representation is "Call Bob at home," the client device may access a contacts list on the client device to determine a home phone number for the contact "Bob," and a phone call may be initiated by a phone application to that phone number. By caching at least some NLU results locally on a client device, the user experience with NLU-based applications on a client device is improved due to increased availability of the NLU results and reduced latencies associated with obtaining them. Additionally, one or more actions associated with some ASR results may be stored on a client device. By directly accessing the stored actions via the techniques described herein, a client device can appear to perform NLU processing for frequent utterances even if the client device does not have NLU processing capabilities.

Although the above-described examples of caching NLU results describe caching recent and/or frequent NLU results, it should be appreciated that any suitable type of NLU results may additionally or alternatively be cached locally on a client device. For example, in some embodiments, NLU results for utterances corresponding to emergency situations (e.g., "Call Fire Department") may be locally cached due to their importance.

Some embodiments are directed to NLU-based systems that include speech-enabled applications, such as virtual assistant software, executing on a client device. The inventors have recognized and appreciated that users often have difficulty learning the available options for interacting with the some speech-enabled applications and often learn through trial and error or by reading release notes for the application. Some embodiments are directed to techniques for training users on the options for what they can say to a speech-enabled application while simultaneously helping users to complete an input in progress by providing real-time feedback by displaying dynamically-generated hints on a user interface of the client device.

Figure 7:
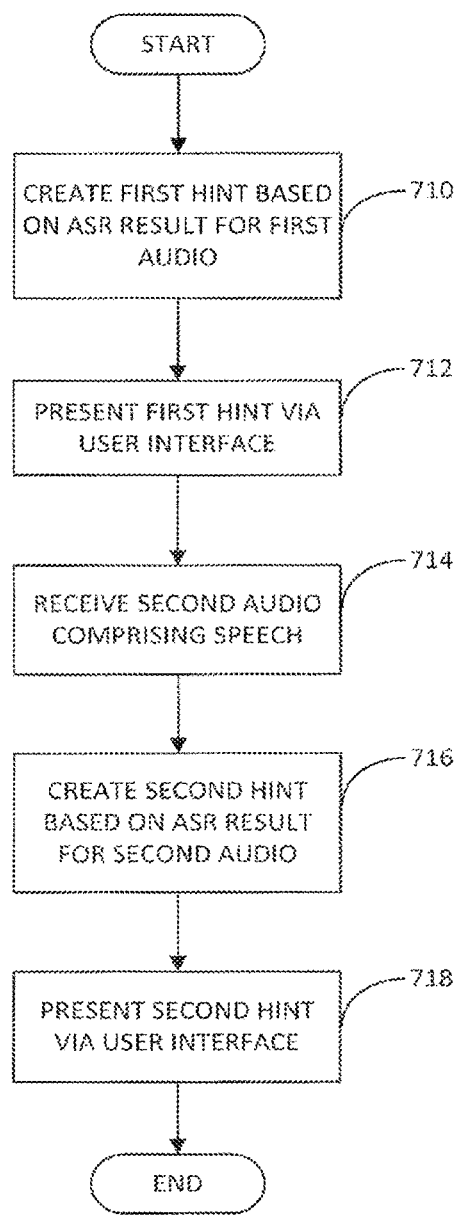
FIG. 7 illustrates a process for displaying dynamically-generated hints on a user interface of a client device in accordance with some embodiments.

FIG. 7 shows an illustrative process for displaying dynamically-generated hints on a user interface of a client device in accordance with some embodiments. In act 710, a first hint is created based, at least in part, on an ASR result determined for first audio. For example, if the ASR result is "make a meeting," a first hint such as "make a meeting on <day> from <start time> to <end time> titled <dictate> may be generated. The process then proceeds to act 712, where the first hint is displayed on a user interface of the client device. By displaying the first hint to the user of the client device, the client becomes aware of the structure and components of an utterance that the speech-enabled application is expecting to receive to be able to perform an action, such as scheduling a meeting.

After the first hint is displayed on the user interface, the process proceeds to act 714, where second audio comprising speech is received by the client device. For example, the user may say "make a meeting on Friday at one." The process then proceeds to act 716, where a second hint is created based, at least in part, on an ASR result corresponding to the second audio. For example, continuing with this example, the second hint may be "make a meeting on Friday at 1 for <duration> titled <dictate>." The process then proceeds to act 718, where the second hint is displayed on the user interface of the client device. By dynamically updating the hint displayed to the user, the user learns how to interact with the speech-enabled application and understands what additional information must be provided to the speech-enabled application in the current utterance to perform a particular action. Teaching users to say particular words, such as "titled" may facilitate the parsing of utterances to reliably separate the utterance into its component pieces, thereby improving an ASR and/or NLU process.

In some embodiments, at least some received second audio may be processed by an ASR engine and/or an NLU engine based, at least in part on a currently- or previously-displayed hint. For example, the second audio in the example above may be processed by an ASR engine using a grammar that restricts speech recognition to the components of the first hint, which may improve ASR accuracy for the second audio.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a USB drive, a flash memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," and "second" in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. An apparatus comprising:
  at least one processor programmed to:
    determine whether an automatic speech recognition (ASR) result, generated by an ASR engine based at least in part on received audio of speech of a user, includes any of one or more prefixes for the user, each of the prefixes being associated with a corresponding threshold time usable by the ASR engine for endpointing, and,
    if it is determined that the ASR result includes at least one prefix of the one or more prefixes stored in a memory, for each of the at least one prefix in the ASR result, update an endpointing wait time used by the ASR engine for endpointing,
    wherein the at least one processor causes the ASR engine to perform dynamic endpointing by instructing the ASR engine to change the endpointing wait time for each of the at least one prefix in the ASR result to the corresponding threshold time associated with the one or more prefixes, respectively.

2. The apparatus of claim 1, wherein the corresponding threshold time associated with a first prefix of the one or more prefixes is the same as the corresponding threshold time associated with a second prefix of the one or more prefixes.

3. The apparatus of claim 1, wherein the corresponding threshold time associated with a first prefix of the one or more prefixes is different from the corresponding threshold time associated with a second prefix of the one or more prefixes.

4. The apparatus of claim 1, wherein the ASR engine is configured to process the received audio as a plurality of segments.

5. The apparatus of claim 4, wherein the ASR engine is configured to process the plurality of segments of the received audio in parallel.

6. The apparatus of claim 1, wherein a prefix or a plurality of prefixes is stored for each of a plurality of users.

7. The apparatus of claim 1, wherein at least one user-independent prefix is stored for all users.

8. The apparatus of claim 1, further comprising:
  an input interface configured to receive audio comprising user speech.

9. The apparatus of claim 1, further comprising:
  an ASR engine configured to generate an ASR result based at least in part on audio of user speech.

10. A method of a speech processing device, the method comprising:
  using at least one processor to:
    determine whether an automatic speech recognition (ASR) result, generated by an ASR engine based at least in part on received audio of speech of a user, includes any of one or more prefixes for the user, each of the one or more prefixes being associated with a corresponding threshold time useable by the ASR engine for endpointing,
    update an endpointing wait time used by the ASR engine for endpointing for each of the one or more prefixes in the ASR result, if it is determined that the ASR result includes at least one prefix of the one or more prefixes, and
    for each prefix of the at least one prefix in the ASR result, respectively, perform dynamic endpointing by instructing the ASR engine to change the endpointing wait time to the corresponding threshold time associated with the prefix.

11. The method of claim 10, wherein the corresponding threshold time associated with a first prefix of the one or more prefixes is same as the corresponding threshold time associated with a second prefix of the one or more prefixes.

12. The method of claim 10, wherein the corresponding threshold time associated with a first prefix of the one or more prefixes is different from the corresponding threshold time associated with a second prefix of the one or more prefixes.

13. The method of claim 10, wherein the at least one processor performs processing for the ASR engine to generate the ASR result, and the ASR engine processes the received audio as a plurality of segments.

14. The method of claim 13, wherein the ASR engine processes the plurality of segments of the received audio in parallel.

15. At least one non-transitory computer-readable storage medium encoded with a plurality of instructions that, when executed by at least one processor of a speech processing device, cause the at least one processor to perform a method comprising:
  determining whether an automatic speech recognition (ASR) result, generated by an ASR engine based at least in part on received audio of speech of a user, includes any of one or more prefixes for the user, the one or more prefixes being associated with a corresponding threshold time useable by the ASR engine for endpointing,
  updating an endpointing wait time used by the ASR engine for endpointing for each of the one or more prefixes in the ASR result, if it is determined that the ASR result includes at least one prefix of the one or more prefixes, and for each prefix of the at least one prefix in the ASR result, respectively, performing dynamic endpointing by instructing the ASR engine to change the endpointing wait time to the corresponding threshold time associated with the prefix.

16. The storage medium of claim 15, wherein the corresponding threshold time associated with a first prefix of the one or more prefixes is same as the corresponding threshold time associated with a second prefix of the one or more prefixes.

17. The storage medium of claim 15, wherein the corresponding threshold time associated with a first prefix of the one or more prefixes is different from the corresponding threshold time associated with a second prefix of the one or more prefixes.

18. The storage medium of claim 15, wherein the method further comprises:

performing processing for the ASR engine to generate the ASR result, the ASR engine processing the received audio as a plurality of segments.

19. The storage medium of claim 18, wherein the ASR engine processes the plurality of segments of the received audio in parallel.

* * * * *